(12) United States Patent
Haubmann

(10) Patent No.: US 7,276,686 B2
(45) Date of Patent: Oct. 2, 2007

(54) METHOD AND DEVICE FOR DETECTING THE OPENING ANGLE OF THE SHUTTER OF AN ADJUSTABLE ROTATING SHUTTER IN A FILM CAMERA

(75) Inventor: Michael Haubmann, Vienna (AT)

(73) Assignee: Arnold & Richter Cine Technik GmbH & Co. Betriebs KG, Munich (DE)

( * ) Notice: Subject to any disclaimer, the term of this patent is extended or adjusted under 35 U.S.C. 154(b) by 258 days.

(21) Appl. No.: 10/505,182

(22) PCT Filed: Mar. 11, 2003

(86) PCT No.: PCT/DE03/00833

§ 371 (c)(1),
(2), (4) Date: Aug. 18, 2004

(87) PCT Pub. No.: WO03/077024

PCT Pub. Date: Sep. 18, 2003

(65) Prior Publication Data
US 2005/0092902 A1    May 5, 2005

(30) Foreign Application Priority Data
Mar. 12, 2002 (DE) .............................. 102 12 563

(51) Int. Cl.
*G01D 5/34* (2006.01)
*G03B 9/10* (2006.01)

(52) U.S. Cl. ........................... 250/231.13; 250/231.18; 352/208; 352/215

(58) Field of Classification Search ................ 250/221, 250/201.5, 237 R, 214 P, 231.13, 231.14, 250/231.16, 231.18; 352/208–220; 396/493, 396/495, 246, 463, 452, 457; 348/363, 364, 348/367, 368

See application file for complete search history.

(56) References Cited

U.S. PATENT DOCUMENTS 3,812,351 A * 5/1974 Coberley ................ 250/231.13
4,889,424 A * 12/1989 Saiki .......................... 352/216

(Continued)

FOREIGN PATENT DOCUMENTS

DE   29 47 333 A1   6/1981
DE   39 02 688 A1   8/1990

OTHER PUBLICATIONS

International Search Report of PCT/DE2003/00833, dated Aug. 4, 2003.
International Preliminary Examination Report of PCT/DE2003/00833, dated Nov. 19, 2003.
English language International Preliminary Examination Report, for International Application No. PCT/DE2003/000833, International Filing date of Mar. 11, 2003, dated Nov. 19, 2003.

*Primary Examiner*—Georgia Epps
*Assistant Examiner*—Pascal M. Bui-Pho
(74) *Attorney, Agent, or Firm*—Christie, Parker & Hale, LLP

(57) ABSTRACT

The invention relates to a method and a device for detecting the opening angle of the shutter (light or dark sector) of an adjustable rotating shutter (1) arranged in a film camera. Said shutter comprises a circular-segment-shaped or circular-sector shaped shutter wing (2) which is driven by a shutter motor via a shutter shaft (20), and also comprises an adjustable shutter adjustment wing (3) arranged in a coaxial manner in relation to the shutter wing (2) and which can be displaced in relation to said shutter wing by means of a shutter adjustment wing motor (33). According to the invention, the position of the shutter wing (2) and the position of the shutter adjustment wing (3) are detected during a rotation of the rotating shutter (1) and the difference between the two positions forms a value for the shutter opening angle or the light or dark sector of the rotating shutter (1).

33 Claims, 6 Drawing Sheets

Figure 1:
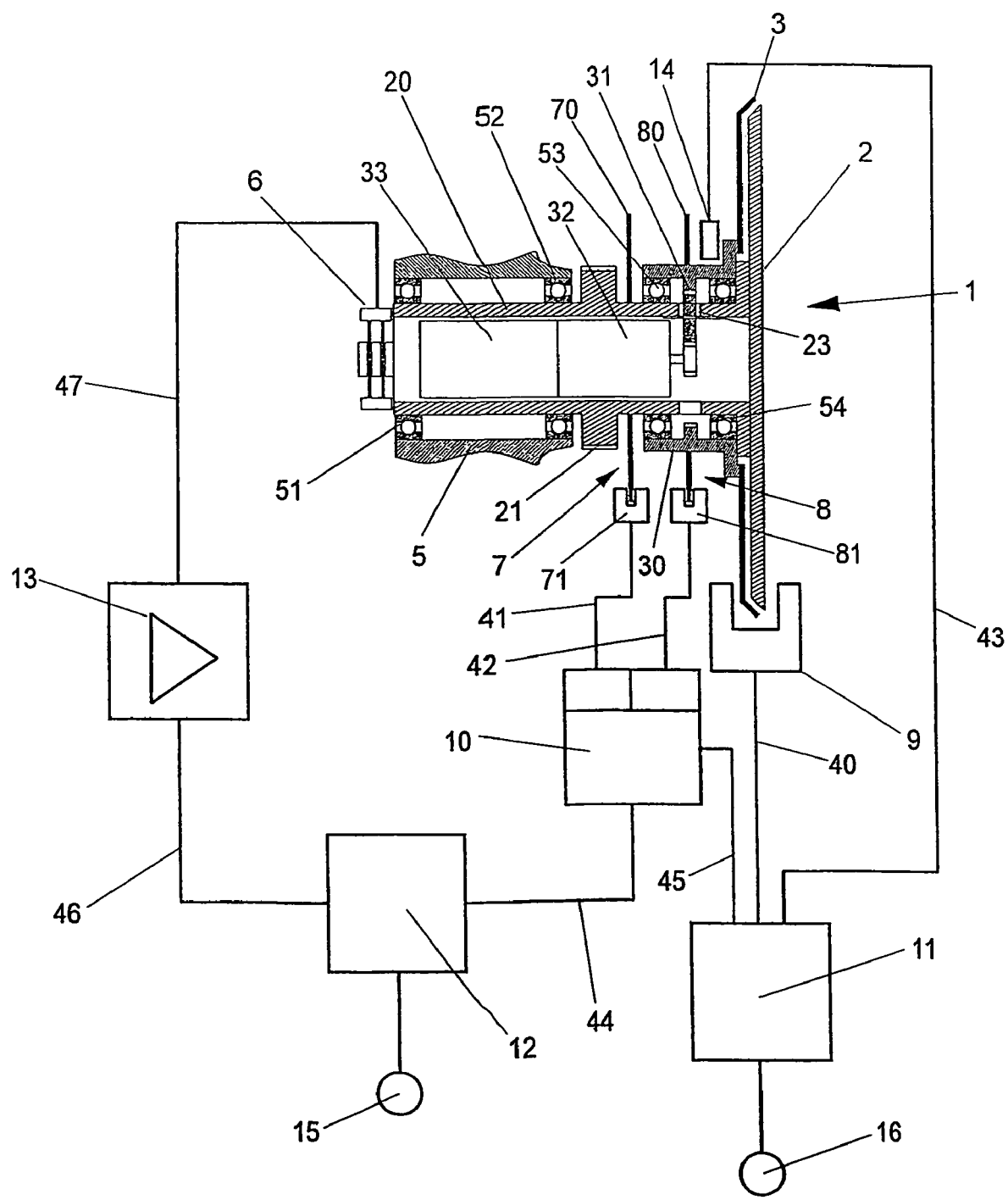

U.S. PATENT DOCUMENTS 5,129,725 A * 7/1992 Ishizuka et al. ............ 356/617
5,137,346 A    8/1992 Sattler et al.
5,850,277 A * 12/1998 Dang et al. ................. 352/214
6,850,351 B1 * 2/2005 Djachiachvili .............. 359/233

* cited by examiner

METHOD AND DEVICE FOR DETECTING THE OPENING ANGLE OF THE SHUTTER OF AN ADJUSTABLE ROTATING SHUTTER IN A FILM CAMERA

CROSS-REFERENCE TO RELATED APPLICATION

This application is a National Phase Patent Application of International Application Number PCT/DE2003/00833, filed on Mar. 11, 2003, which claims priority of German Patent Application Number 102 12 563.5, filed on Mar. 12, 2002.

The invention relates to a method and device for detecting the opening angle of a shutter of an adjustable rotating shutter in a film camera.

From DE 39 02 688 C2 an adjustable rotating shutter is known for a film camera which consists of a shutter vane and an adjustable shutter adjustment vane movable coaxial with the shutter vane and connected through gearing to a shutter adjustment vane motor coupled to the shutter shaft. Between the shutter adjustment vane and the shutter shaft or shutter is a potentiometer which is connected to the shutter shaft and whose sliding contact is connected to the shutter adjustment vane and thus sends out a signal corresponding to the position of the shutter adjustment vane relative to the shutter shaft or shutter. Furthermore the shutter shaft has slip ring contacts for supplying current for the shutter adjustment vane motor and for issuing the actual value of the position of the shutter adjustment vane relative to the shutter as detected at the potentiometer.

A light beam which is additionally mounted in the region of the adjustable rotating shutter measures the light sector of the adjustable rotating shutter during rotation of the adjustable rotatable shutter and enables an additional actual/ideal value comparison for fine correction and improved accuracy of the shutter adjustment independent of system tolerances.

In order to control and regulate the light sector of the adjustable rotating shutter a control and regulating device is provided which on the input side is connected to the slip ring contacts connected to the potentiometer and to an ideal value transmitter for the size of the light sector and which on the output side is connected through an amplifier to two slip ring contacts connected to the shutter adjustment vane motor for the shutter adjustment vane.

The known device for detecting, controlling and regulating the light sector of an adjustable rotating shutter enables adjustment of the shutter adjustment sector both during operation and in the rest state of the adjustable rotating shutter, a manual adjustment of the shutter adjustment sector as well as detection of the set value in the stationary state of the adjustable rotating shutter. The known device requires in any case as a result of the component parts co-rotating with the adjustable rotating shutter a high degree of manufacturing precision as well as the use of expensive component parts in order to avoid faults during operation of the film camera.

The object of the present invention is to detect the shutter opening angle or light or dark sector of an adjustable rotating shutter with simple means and low manufacturing expense with the greatest accuracy and high functional reliability.

The solution according to the invention enables and guarantees a detection of the shutter opening angle or light or dark sector of an adjustable rotating shutter with great accuracy and functional reliability, i.e. with minimum susceptibility to breakdown, with low manufacturing costs and low outlay for component parts.

The method according to the invention is based on the knowledge that the detection of the shutter opening angle, i.e. of the light sector (or alternatively of the dark sector) of an adjustable rotating shutter is possible by detecting the position of the shutter vane and the shutter adjustment vane and a deviation derived therefrom between the two position values through a contactless detection of the shutter and shutter adjustment vane position and from this of the shutter opening angle or the light or dark sector of the adjustable rotating shutter.

For this reason it is possible to eliminate an expensive measuring of the shutter opening angle or light sector by means of a co-rotating potentiometer whose measuring signals are sent to a control and regulating device through slip ring contacts for deriving a setting value from the detected actual value and an inputted ideal value.

The position deviation between the shutter vane and the shutter adjustment vane is in particular determined from the difference determined by scanning the positions of the shutter vane and the shutter adjustment vane, more particularly by a scanning of the separate positions of the shutter vane and shutter adjustment vane.

This development of the method according to the invention with both separately detecting the positions of the shutter vane and shutter adjustment vane and also with a sensor separate from the shutter vane and the shutter adjustment vane guarantees a high resolution of the position detection since this is not dependent on the marking points of the shutter vane and shutter adjustment vane, and enables the use of different sensors which can be selected in accordance with the precision requirements and expense.

Since according to the method according to the invention the opening angle of the shutter is determined from the difference of the positions of the shutter vane and shutter adjustment vane, the detection of the position of the shutter and shutter adjustment vane can be carried out both through absolute and incremental measuring systems. As a further alternative an incremental position detection can be combined with a reference mark detection so that an absolute position determination of the shutter vane and shutter adjustment vane is possible at least after one revolution of the moving rotating shutter.

In a first variation of the method according to the invention the absolute position of the shutter vane and the absolute position of the shutter adjustment vane is detected with a resolution of n steps during one revolution of the rotating shutter and the shutter opening angle ($\alpha$) of the rotating shutter is determined from the equation $$\alpha = P_{BF} - P_{VF} * 360°/n$$

with $P_{BF}$ the position of the shutter vane and
$P_{VF}$ the position of the shutter adjustment vane whereby with an angle $\alpha$ which is less than 0° the value is increased around 360° so long until it is greater than or equal to 0° or with an angle $\alpha$ which is greater than or equal to 360° the value is reduced around 360° so long until it is less than 360°.

The absolute position determination of the shutter vane and shutter adjustment vane supplies a clear position value with a resolution of n steps per revolution of the moving rotating shutter and thus also in the switch-on state of the rotating shutter a position reference for the absolute position between the shutter and the shutter adjustment vane and thus a value for the shutter opening angle.

The absolute position determination of the shutter and shutter adjustment vane can thus take place both from coded sensor tracks and also through a sine and cosine signal per revolution of the rotating shutter whereby with a detection of a sine and cosine signal the shutter opening angle of the rotating shutter is determined through an arctan calculation from the sine and cosine signal.

When using incrementally measuring sensors the sensors associated with the shutter vane and shutter adjustment vane supply a periodic impulse sequence with a resolution of n steps. Since the problems of using incrementally measuring sensors lie in the fact that in the switch-on state there is no position reference for the absolute position of the shutter vane and shutter adjustment vane, an incremental detection of the position of the shutter vane and the shutter adjustment vane is combined with the detection of at least one index or reference mark signal per revolution.

With this method for detecting the shutter opening angle from the positions of the shutter vane and shutter adjustment vane, within the first motorised revolution of the overall system the state of a position counter counting the incremental signals with the appearance of the reference marks is temporarily stored whereby the reference marks are either already adjusted mechanically to each other or however are linked together through a correction value which is recorded in a non-volatile calibration memory. The opening angle α of the moving rotating shutter is thereby calculated from the equation $$\alpha = (Z_{BF} - Z_{VF} + K) * 360/n$$

with $Z_{BF}$ the counter state of the shutter vane,
$Z_{VF}$ the counter state of the shutter adjustment vane, and
O a constant off-set.

Since the index positions and the calibrating value are constant a constant off-set can be determined from the equation $$O = I_{BF} + I_{VF} + K$$

with $I_{BF}$ the index position of the shutter vane,
$I_{VF}$ the index position of the shutter adjustment vane and
K the calibrating value wherein with an angle α which is less than 0°, the value is increased around 360° until it is greater than or equal to 0° or with an angle α which is greater than or equal to 360° the value is reduced around 360° until it is less than 360°. The calibrating value K is a correction value which is produced from the relationship of the reference marks coupled with the revolutions of the shutter vane and revolutions of the shutter adjustment vane.

In a special embodiment the absolute position of the shutter vane and shutter adjustment vane can be determined from distance-coded reference marks.

Since with an arrangement of one or more reference marks in a reference mark track parallel to an incremental track for producing an absolute reference a reference mark has to be approached, which in the most unfavourable case requires travelling over large parts of the detection range, the arrangement of distance-coded reference marks, in which in addition to the incremental track there is a reference mark track on which reference marks are made with defined different distances, offers the advantage that the absolute position of the shutter reference marks.

The detection of the position of the shutter vane and the shutter adjustment vane for determining the shutter opening angle of the moving rotating shutter preferably serves for the adjustment and regulation of the shutter opening angle in that the light or dark sector determined from the difference of the position of the shutter vane and shutter adjustment vane is supplied as actual value to a shutter adjusting vane position regulating device at which an ideal value of the light or dark sector inputted through an interface for the camera control is issued and which forms from the difference of the ideal and actual value of the light or dark sector a setting value for the shutter adjustment vane motor.

Thus a high-precision adjustment of the shutter opening angle is undertaken dependent on the resolution of the position detection and the further-processed actual value signals and on the accuracy of the ideal value target, and can be regulated in conjunction with a closed regulating loop in the case of different film speeds.

The control logic thereby undertakes the initialisation of the position measuring and serves in addition to produce an absolute reference through for example an index or reference mark track as well as for safety monitoring when using an exclusively incremental position detection system.

A further variation of the solution according to the invention is characterised in that the positions of the shutter and shutter adjustment vane before forming the difference are interpolated to determine the shutter opening angle.

Through safety monitoring which is already integrated in cameras in many cases the shutter opening angle can be additionally monitored with the control logic.

Furthermore the mechanical locking of the shutter adjustment vane can be scanned once per revolution of the rotating shutter with predetermined frequency and in the event of activated mechanical locking of the shutter adjustment vane a control of the shutter adjustment vane motor can be blocked so that a control which would endanger the shutter adjustment vane motor in the event of a mechanically locked shutter adjustment vane is avoided.

The position signals which indicate the position of the shutter and shutter adjustment vane, the absolute value of the light or dark section of the adjustable rotating shutter and the signals scanning the mechanical locking or unlocking of the shutter adjustment vane are preferably processed in a control logic which in particular also initialises the position detections.

The setting value for the shutter adjustment vane motor can be transferred both through slip rings and also contactlessly from the shutter adjustment vane position regulating device to the shutter adjustment vane motor.

A device for detecting the shutter opening angle or light or dark sector of an adjustable rotating shutter mounted in a film camera, and which consists of a circular segment or circular sector shaped shutter vane driven by a shutter motor through a shutter shaft, and of a shutter adjustment vane which is mounted coaxial with the shutter vane and is displaceable relative to same by means of a shutter adjustment vane motor, has a sensor coupled to the shutter vane for scanning the shutter position and issuing shutter vane position signals, a sensor coupled to the shutter adjustment vane for scanning the position of the shutter adjustment vane and issuing shutter adjustment vane position signals, and a position counter charged with shutter vane position signals and the shutter adjustment vane position signals to form the difference in the shutter vane position signals and the shutter adjustment vane position signals.

The device according to the invention enables detection of the shutter opening angle or light or dark sector of an adjustable rotating shutter with any sized precision and functional reliability as well as minimum susceptibility to breakdown with at the same time low costs for the component parts which are required for detecting the shutter opening angle and which are more particularly standardised.

The sensors can consist of absolute angle measuring instruments with several code tracks mounted on a graduated plate and scanning devices associated with the code tracks, more particularly of absolute coders, resolvers or pole wheel sensors, or of incremental angle measuring instruments with periodic incremental track and reference mark track mounted on a graduated plate which has at least one reference mark fixing the absolute position of the graduated plate and assigning a measuring step to same, and of the scanning devices associated with the incremental and reference mark track.

In one embodiment the reference mark track can have distance-coded reference marks on which reference marks are made with defined different spacing.

The sensors can have graduated plates with additional sine and cosine tracks whereby the scanning device sends the detected sine and cosine signals to a computing unit on the output side which calculates arctan values from the sine and cosine signals.

The sensors can be formed as absolute or incremental angle measuring instruments with photoelectric, magneto-resistive or permanent-magnetic scanning.

In order to detect, adjust and/or regulate the shutter opening angle (light or dark sector) of the adjustable rotating shutter mounted in a film camera there is a control logic which is charged with the difference of the shutter vane position signals and the shutter adjustment vane position signals and which is connected to an interface for the control of the film camera, as well as a shutter adjustment vane position regulating device which on the input side is charged with the difference of the shutter vane position signals and the shutter adjustment vane position signals as well as with an ideal value issued by the control of the film camera through an interface for the shutter adjustment vane or for the light or dark sector of the adjustable rotating shutter, and which on the output side issues a setting value for the shutter adjustment vane motor.

Furthermore in the rotational area of the adjustable rotating shutter a safety scanning device can be provided to detect the light or dark sector of the adjustable rotating shutter whose output is connected to the control logic for issuing absolute values of the light or dark sector of the adjustable rotating shutter.

In addition the control logic can be connected on the input side to a scanning device for detecting the mechanical locking of the shutter adjustment vane which blocks control of the shutter adjustment vane motor when the shutter adjustment vane is mechanically locked.

The shutter adjustment vane position regulating device is connected through a device for controlling the shutter adjustment vane motor to an energy transfer device for feeding the shutter adjustment vane motor and through a signal transfer device to a motor amplifier for controlling the shutter adjustment vane motor whereby both the energy transfer device and the setting value transfer device can operate contactlessly.

A contactless energy transfer device can consist of a divided transformer operated with high frequency whose primary winding is connected to a direct current converter on the primary side and whose secondary winding is connected to a direct current converter on the secondary side.

For bi-directional communication between the rotating structural assembly and the camera electronics there is a processor provided in the rotating structural assembly which is connected by a first output to a control input of the motor amplifier connected to the energy transfer device and by a first input to the output of an actual value measuring amplifier which is attached to a potentiometer transmitter coupled to the shutter adjustment vane motor. Each one second input and output of the processor is connected to a contactless bi-directional signal transfer device which consists either of an optical transmitter and optical receiver, an inductive signal transfer device or a carrier-frequency signal transfer device where the setting value is modulated up with a carrier frequency to the energy supply of the shutter adjustment vane motor.

As an alternative to the contactless energy and signal transfer it is possible for the shutter adjustment vane position regulating device to control the shutter adjustment vane motor through a motor end stage and rotary transmission or slip ring.

Figure 2:
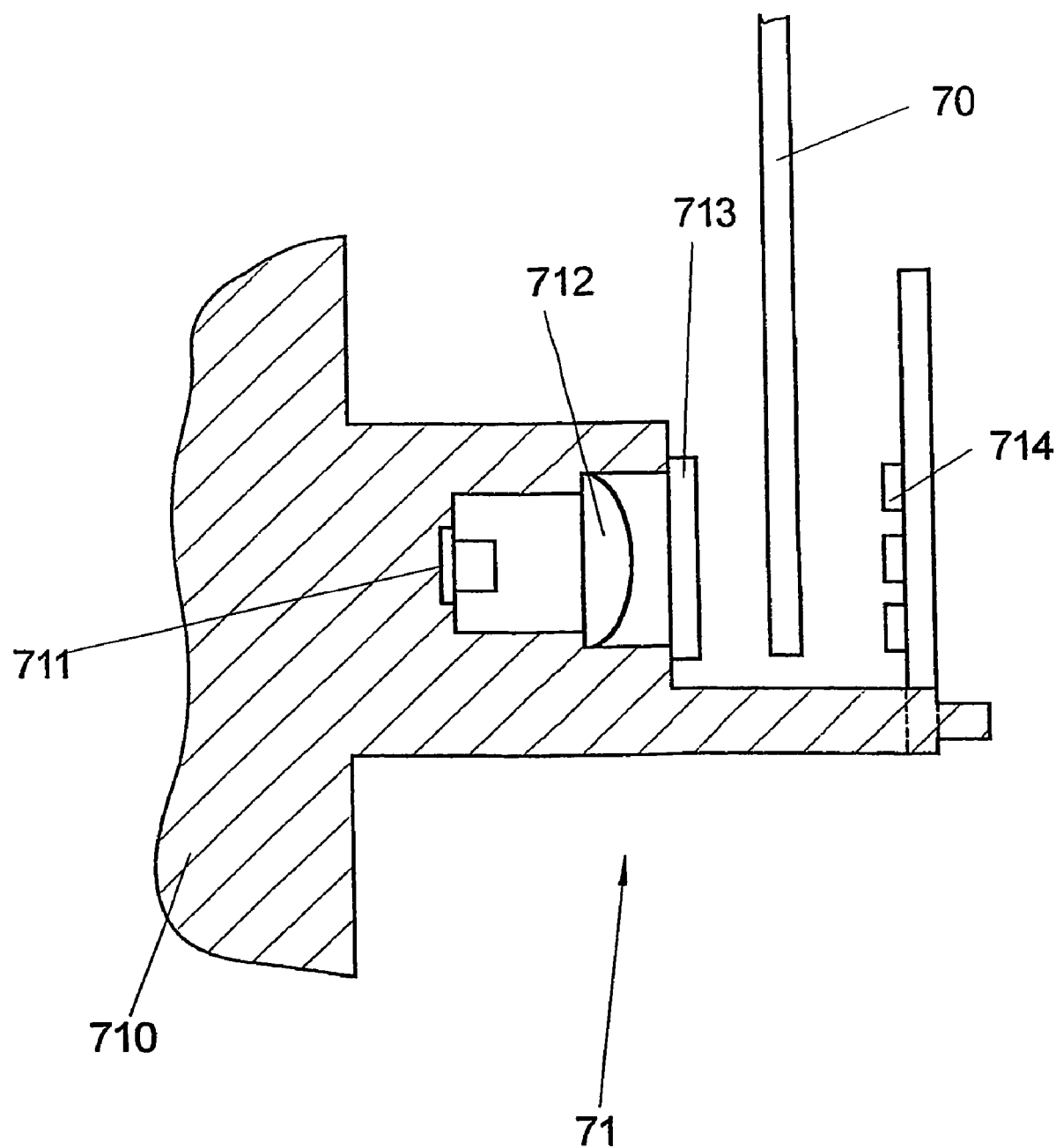
Figure 3:
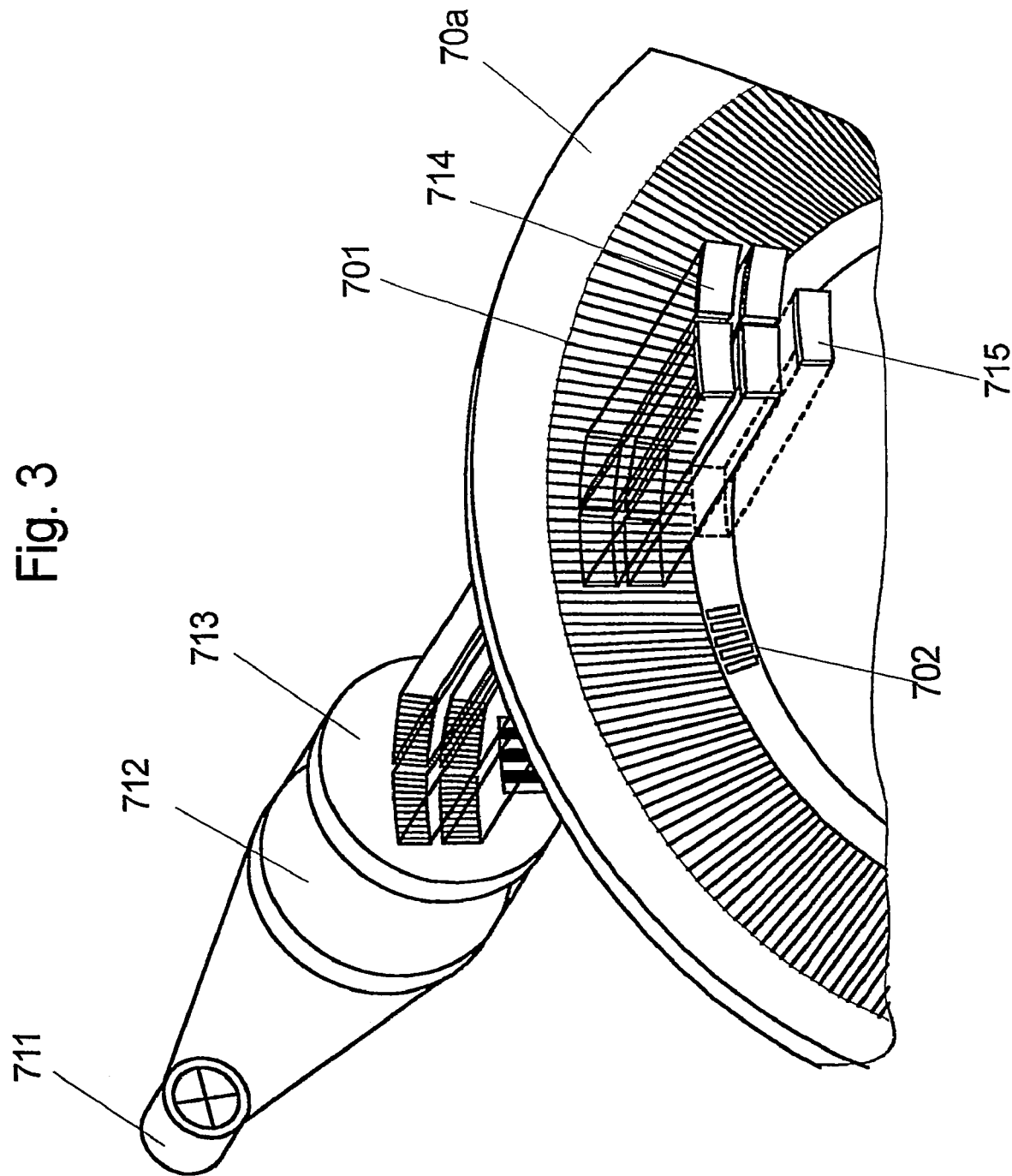
Figure 4:
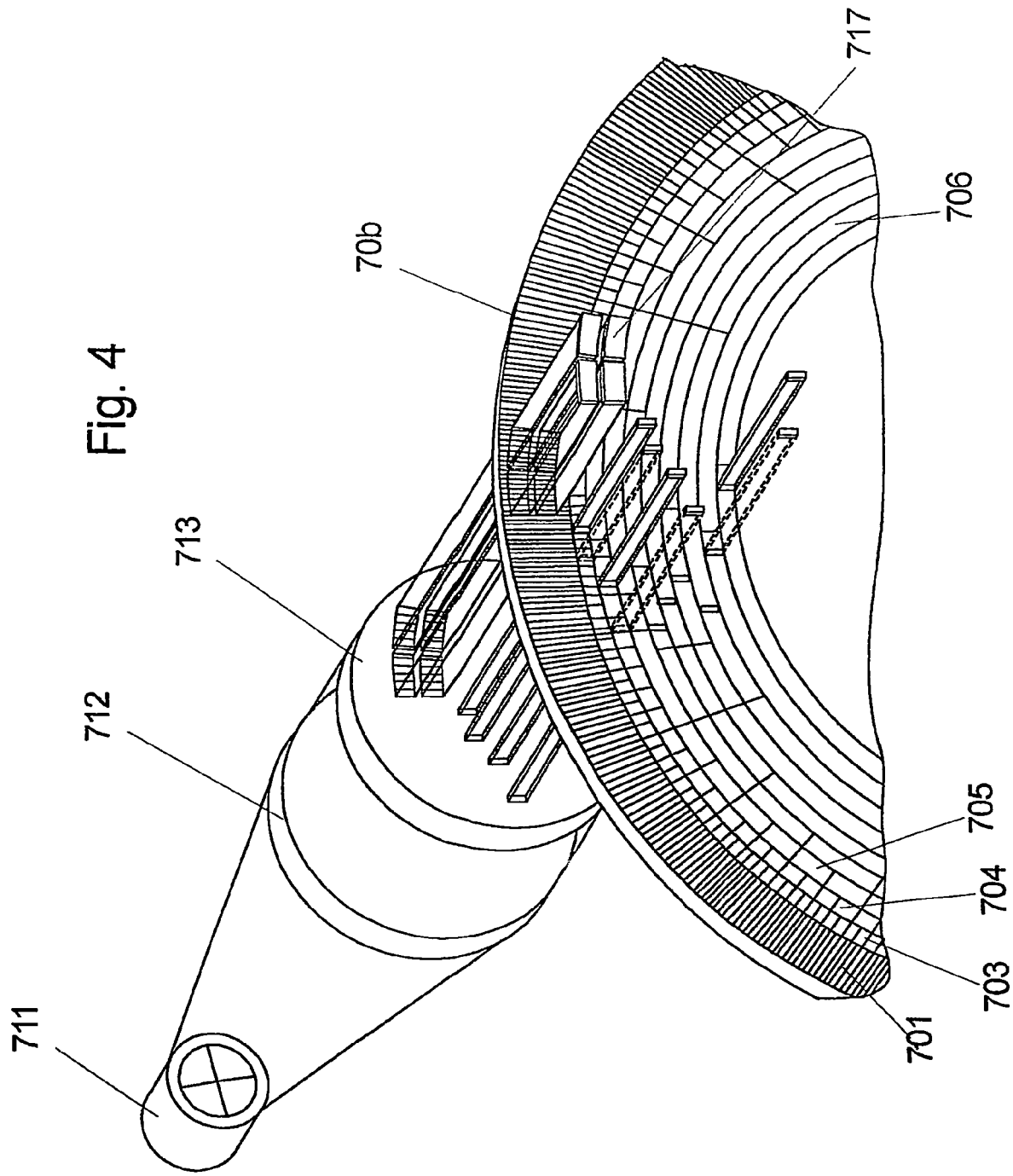
Figure 5:
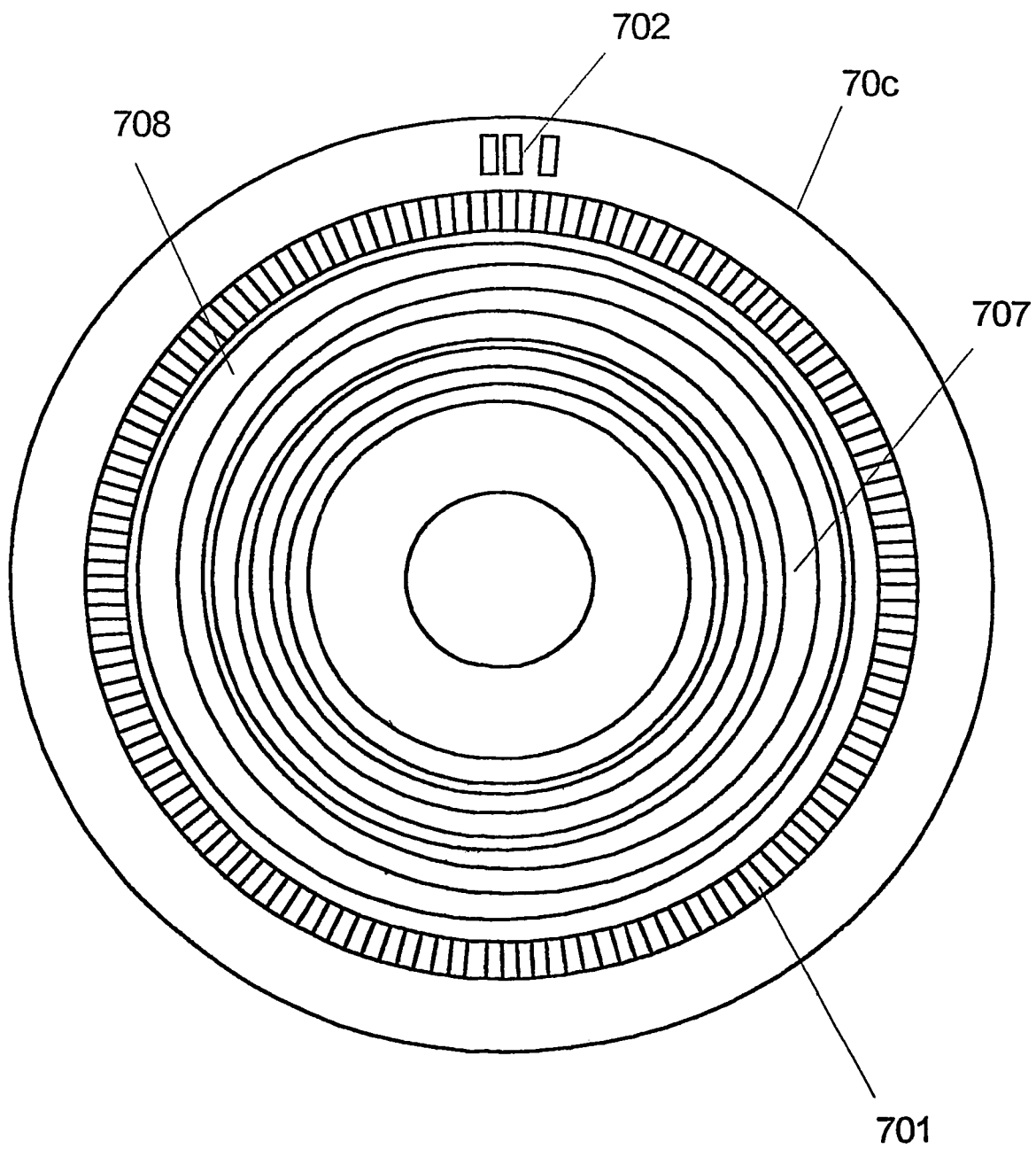
Figure 6:
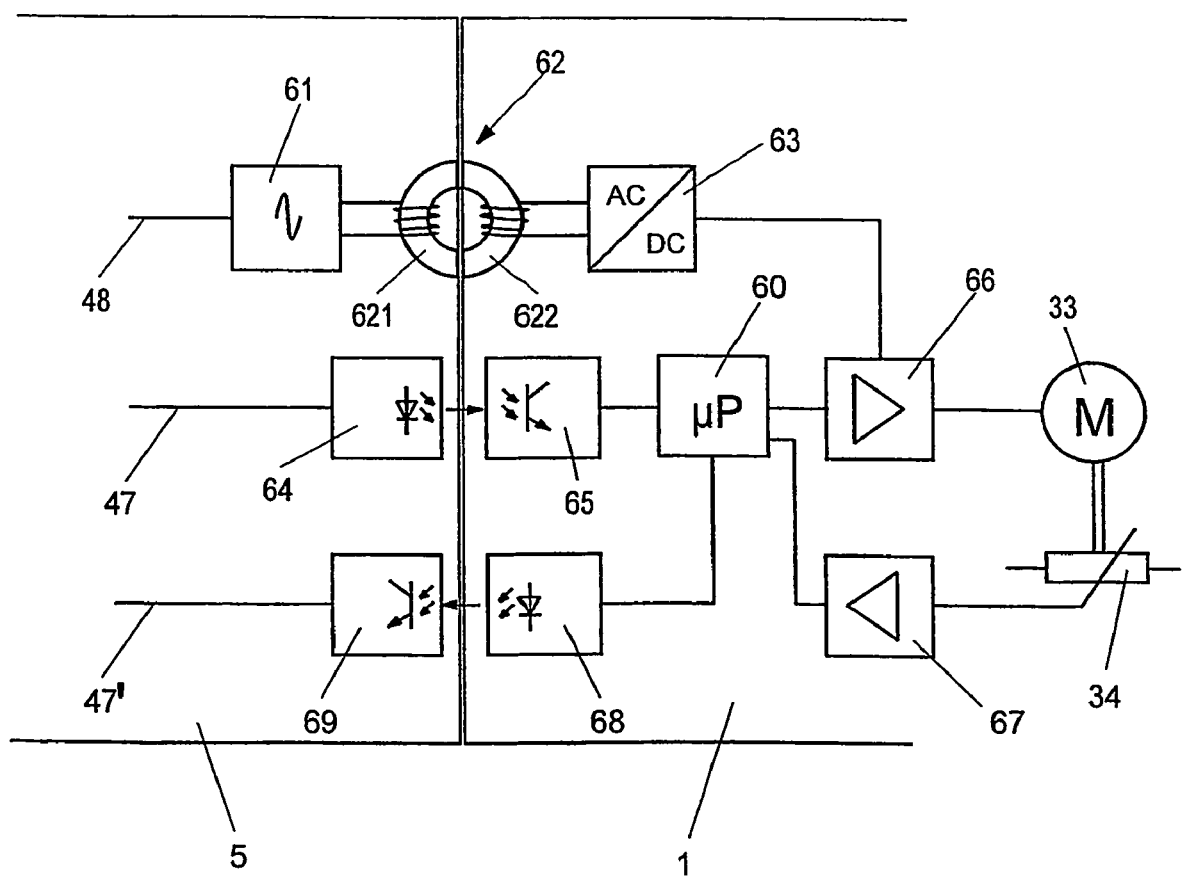

The idea on which the invention is based will now be described with reference to the embodiments shown in the drawings. They show:

FIG. 1 a diagrammatic view of a device for detecting, adjusting and regulating the shutter opening angle of an adjustable rotating shutter;

FIG. 2 a section through a diagrammatic illustration of an opto-electronic sensor;

FIG. 3 a diagrammatic view of an opto-electronic sensor with a graduated plate with incremental and reference mark track;

FIG. 4 a section of a graduated plate for absolute position determination with incremental track and several code tracks;

FIG. 5 a section of a graduated plate with incremental track and off-set sine and cosine tracks; and FIG. 6 a diagrammatic view of a device for contactless control and energy transfer for a shutter adjustment vane motor.

FIG. 1 shows diagrammatically an adjustable rotating shutter 1 which consists of a circular sector or circular segment shaped shutter vane 2 and a likewise circular sector or circular segment shaped shutter adjustment vane 3 which is mounted coaxial with the shutter vane 2 and is adjustable radially relative to the shutter vane 2. By radially adjusting the shutter adjustment vane 3 opposite the shutter vane 2 it is possible to vary the opening angle of the shutter between the two vanes 2, 3, i.e. the light sector which exposes the recording beams from the recording lens to the film is increased or reduced and correspondingly the dark sector formed by the shutter vane 2 and the shutter adjustment vane 3 is conversely enlarged or reduced. The usually reflective surface of the shutter vane 2 and shutter adjustment vane 3 thus causes when covering the moving film a diversion of the recording beams through a reproducing lens to the viewfinder glass or through beam dividers to a video reflection or the like.

The shutter vane 2 is connected to a shutter shaft 20 which is supported by ball bearings 51, 52 opposite a camera housing or camera skeleton frame 5. The drive for the shutter shaft 20 is through a drive pinion 21 which is connected to the shutter motor or through gearing to the camera motor.

The shutter adjustment vane 3 is connected to a shutter adjustment vane shaft 30 which is supported against the shutter shaft 20 through ball bearings 53, 54. The shutter adjustment vane shaft 30 is connected through a planetary gearing 31 guided through an opening 23 in the shutter shaft 20 to a shutter adjustment vane gearing 32 which is driven by a shutter adjustment vane motor 33 whereby the shutter adjustment vane motor 33 and the shutter adjustment vane gearing 32 are mounted inside the shutter shaft 20.

The shutter adjustment vane motor 33 is fed through a rotating or contact-free energy transfer device 6, by way of example through a slip ring assembly or a contactless energy and setting value transfer illustrated in FIG. 6.

Sensors 7, 8 are provided in order to detect the absolute positions of the shutter vane 2 and the shutter adjustment vane 3 or to detect the relative position of the shutter adjustment vane 3 opposite the shutter vane 2 and thus to determine the shutter opening angle, i.e. light and dark sector of the adjustable rotating shutter 1.

The sensor 7 for detecting the position of the shutter vane 2 comprises a first graduated plate 70 connected to the shutter shaft 20 and a scanning device 71 scanning the first graduated plate 70.

The sensor 8 which detects the position of the shutter adjustment vane 3 comprises a second graduated plate 80 which is coupled to the shutter adjustment vane shaft 30, as well as a second scanning device 81 which scans the first graduated plate 80.

Both graduated plates 70, 80 have one or more radially aligned tracks mounted next to each other and scanned by means of the scanning devices 71, 81. The scanning devices 71, 81 send shutter and shutter adjustment vane position signals to a digital position counting and difference forming device 10 which forms from the difference between the shutter vane position signals and shutter adjustment vane position signals a value for a shutter opening angle or light or dark sector of the rotating shutter 1. Various different possibilities for the structuring of the graduated plates 70, 80 as well as an opto-electronic configuration of the scanning devices 71, 81 are illustrated in FIGS. 2 to 5 and will now be explained in further detail below.

The digital position counting and difference forming device 10 issues at its outputs position actual values or values of the shutter opening angle or light or dark sector of the rotating shutter both to a shutter adjustment vane position regulating device 12 and also to a control logic 11. The control logic 11 is additionally connected to an interface 16 for controlling the film camera. The control logic 11 is connected through a further connecting line 40 to a security scanning device 9 which consists for example of a light barrier or an echo element and sends an additional signal for the shutter opening angle, light or dark sector of the adjustable rotating shutter 1 to the control logic 11.

The control logic 11 is connected through a further lead 43 to a scanning device 14 which detects the mechanical locking of the shutter adjustment vane 3 with the shutter vane 2 and which in the event of locking issues a blocking signal to the control optic and thus in the event of a mechanically locked shutter adjustment t vane 3 prevents control of the shutter adjustment vane motor 33. The scanning device 14 enables a differentiated fault recognition which differentiates a faulty operation, for example a mechanical locking, from a breakdown fault, for example a jammed gearing so that with an active mechanical locking the shutter adjustment vane motor 33 is not controlled in order to prevent damage to the sensitive mechanisms.

The shutter adjustment vane position regulator 12 is also charged in addition to the position actual value issued by the digital position counting and difference forming device 10 with an ideal value issued through an interface 15 for camera control for the shutter adjustment vane position and issues at its output a setting value signal through a lead 46 to an amplifier 13 for controlling the shutter adjustment vane motor 33. For this purpose the amplifier 13 is connected through a connecting lead 47 to the static part of a transfer device 6 whose rotating part is connected to the shutter adjustment vane motor 33.

The transfer device 6 can consist for example of a slip ring assembly where the slip rings mounted on a motor shaft are contacted by brushes which are connected to the connecting lead 47.

An alternative transfer device 6 is illustrated in FIG. 6 and shows a contactless energy and bi-directional signal transfer device.

The sensors 7, 8 for detecting the position of the shutter vane 2 and the shutter adjustment vane 3 can operate according to an opto-electronic, magneto-resistive, inductive capacitative or permanent magnetic scanning principle. An opto-electronic sensor is shown in longitudinal section in FIG. 2.

Common to all the scanning principles is a graduated plate 70, 80 which is connected to the shutter shaft 20 and shutter adjustment shaft 30 respectively and which contains in incremental or coded form scanning tracks which are scanned by means of the scanning devices 71, 81. FIGS. 3 to 5 illustrate various possibilities for the configuration of graduated plates with incremental and coded or sine- and cosine type scanning tracks which will also be explained in further detail below.

The sectional view through an opto-electronic sensor shown in FIG. 2 shows by way of example the graduated plate 70 coupled to the shutter shaft 20 for detecting the position of the shutter vane 2 as well as a scanning device 71 for scanning the graduated plate 70. The principle construction of the opto-electronic sensor illustrated in FIG. 2 corresponds to the conventional opto-electronic angle measuring instruments with a photo electrically scanned graduation with up to 18.000 or 36.000 radial division lines on one graduated plate 70 which is formed by way of example as a glass plate. Since the opto-electronic sensor is mounted inside the camera housing which is already protected against dust, dirt and water, there is no need for any additional housing since the film is guided and protected against outside light so that the sensor housing 710 can be part of the camera housing.

The scanning device 71 consists of a semi-conductor light source 711, a condenser lens 712 and a scanning plate 713 which are mounted on the one side of the graduated plate 70 whilst on the other side of the graduated plate 70 there are photo diodes 714 so that the beams originating from the semi conductor light source 711 are converted by means of the condenser lens 712 into parallel light beams and pass, through the divisions provided in the scanning plate 713 and the incremental and code signal tracks arranged on the graduated plate 70, to the photo diodes 714. The photo diodes 714 are connected in a manner not illustrated in further detail through a follow-up electronics with analogue/digital converter and where applicable a multiplex device is used with the digital position counting and difference forming device 10 according to FIG. 1.

FIG. 3 shows a perspective view of a sensor with photo electric scanning, according to a copying measuring principle, and a graduate plate with incremental track and reference mark track.

The sensor contains a light source 711 which preferably consists of a light-emitting diode, a condenser lens 712 for producing parallel light beams which fall onto a scanning plate 713, which has both a lined grid for the incremental track 701 of a graduated plate 70a and also a lined grid for the reference mark track 702 of the graduated plate 70a. The sensor which operates in the transmitted-light process according to FIG. 3 has on the other side of the graduated disc 70a photo elements 714, 715 which are aligned with the incremental track 701 and the reference mark track 702.

Since the lined grid of the incremental track 701 and reference mark track 702 is moved relative to the counter grid of the same structure of the scanning plate 713, the lined grids of the incremental track 701 and reference mark grid 702 of the graduated plate 70a alternately overlap with those of the scanning plate, thereby generating light/dark modulations which are detected by the photo elements 714, 175.

With the sensor illustrated in FIG. 3 a reference mark 702 is mounted on the graduated plate 70a. To produce an absolute reference, the reference mark 702 must be approached by the parallel light beams which in the most unfavourable case requires a complete revolution of the graduated plate 70a and thus of the shutter vane 2 and shutter adjustment vane 3 respectively. In order to accelerate the approach of a reference mark instead of one single reference mark 702 a distance-coded reference mark track can be provided in which next to the incremental track 701 is a track on which reference marks are provided at defined different spacing. The absolute position of the shutter vane 2 according to FIG. 2 or shutter adjustment vane 3 according to FIG. 1 is thereby already determined after travelling over two adjoining reference marks.

An alternative to a sensor with an incremental track and a reference mark track, is an absolute value sensor which is shown diagrammatically in perspective in the form of a sensor with photoelectric scanning in FIG. 4.

The sensor illustrated in FIG. 4, similarly with the sensor illustrated in FIG. 3 has a light source 711, a condenser lens 712 and a scanning plate 713. A graduated plate 70b is different from the graduated plate 70a of the sensor illustrated in FIG. 3 in that in addition to an incremental track 701 several code tracks 703 to 706 arranged radially side by side and which are scanned by means of the photo elements 717 are assigned to the individual tracks. The coding of the code tracks 703 to 706, may be accomplished in various ways for example using gray code.

FIG. 5 shows a plan view of a graduated plate 70c in which next to a reference mark 702 and an incremental track 701 there are two tracks 707, 708 radially off-set from the incremental track 701 from which a sine and cosine signal is obtained. The width of the tracks 707, 708 changes over the circumference and the maximum widths of the two tracks are off-set from each other by 180°. Through antiparallel connection of the photo elements scanning the graduated plate 70c arise output signals symmetric with the zero line with a signal period per revolution from which through an arctan calculation an absolute value is obtained for the shutter opening angle or the light/dark sector of the adjustable rotating shutter 1 according to FIG. 1.

In order to set a desired shutter opening angle or regulate the shutter opening angle, a corresponding control of the shutter adjustment vane motor 33 is necessary according to FIG. 1. This control can—as already explained in respect of FIG. 1—take place through slip rings from the amplifier 13 to the shutter adjustment vane motor 33 or alternatively with a motor control illustrated in FIG. 6.

FIG. 6 shows in a diagrammatic block circuit diagram a device for the contactless energy transfer as well as electronics for controlling the shutter adjustment vane motor 33 and sending actual values of the adjustment shutter 1 to the camera. The structural elements associated with the camera skeleton frame or camera housing 5 are combined in a left block and the component parts associated with the rotating adjustable rotatable shutter 1 are combined in a right block. A controller or processor 60 for the bi-directional communication between the rotating adjustment shutter 1 and camera is integrated in the electronics illustrated in FIG. 6.

The energy fed to the shutter adjustment vane motor 33 co-rotating with the shutter shaft 20 is transferred through an energy transfer device 61, 62, 63 from the camera to the adjustment shutter 1 and consists of a high-frequency-operated divided transformer 62 whose primary winding 621 is connected to a direct current converter or inverter 61 on the primary side and whose secondary winding 622 is connected to a direct current converter or rectifier 63 on the secondary side. The direct current converter 61 on the primary side is connected to a current supply line 48 whilst the direct current converter 63 on the secondary side is connected to a rotating amplifier 66, more particularly to a 4-quadrant motor amplifier whose output feeds the shutter adjustment vane motor 33 and whose control input is connected to a first output of the processor 60.

The electronics contains a first signal transfer device 64, 65 for transferring a setting value with an optical transmitter 64 which is connected to the camera housing 5 and which is connected by way of example to the output of the shutter adjustment vane position regulating device 12 according to FIG. 1 through a control line 47 which transfers data from the camera to the rotating structural group or adjustment shutter 1. The optical signals issued from the optical transmitter 64 are received by an optical receptor 65 connected to the adjustment shutter 1 and are sent as control signals to a first input of the processor 60.

A second signal transfer device 68, 69 for transferring the actual value has an optical transmitter 68 rotating with the adjustment shutter 1 and connected to a second output of the processor 60. The signals of the optical transmitter are received by an optical receptor 69 connected to the camera housing 5 and are connected through a control line 47' to the input of the shutter adjustment vane position regulating device 12 according to FIG. 1. The control line 47' can be a bi-directional control and data line like control line 47 and transfers data from the adjustment shutter 1 to the camera.

A second input of the processor 60 is connected to the output of an actual value measuring amplifier 67 whose input is attached to a potentiometer transmitter 34 coupled to the shutter adjustment vane motor 33 and sends the relevant actual value of the position of the adjustment shutter 1 to the processor 60.

Instead of a bi-directional optical signal transfer for the setting value of the shutter adjustment vane motor 33 a bi-directional inductive signal transfer can also be selected where a corresponding transmitter is connected to the camera housing 5 and a receptor is connected to the adjustment shutter 1 for the contactless signal transfer, whereby the bi-directional inductive signal transfer takes place through a impulse transmitter whose primary winding is connected to the camera skeleton frame 5 and whose secondary winding is connected to the adjustment shutter 1.

A further alternative consists in designing the setting values transfer device as a bi-directional carrier-frequency signal transfer device where the setting values and data are modulated up with a carrier frequency to the energy supply of the shutter adjustment vane motor 33.

Both with the optical and with the inductive or carrier-frequency signal transfer it is possible for the bi-directional communication to take place either in the semi or full duplex method. With a full duplex transfer the separation of the two data directions takes place either through different carrier frequencies or with the optical data transfer through different wave lengths and/or divider prisms.

With the contactless signal and energy transfer illustrated in FIG. 6 the energy fed to the shutter adjustment vane motor 33 is transferred through the divided high-frequency operated transformer 62 from the static camera skeleton 5 to the rotating shutter 1 whereby the transferred high frequency voltage after rectification in the direct current converter 63 on the secondary side supplies the rotating amplifier 66 with energy for controlling the shutter adjustment vane motor 33.

The current supply to the shutter adjustment vane motor 33 from the rotating amplifier 66 takes place in the beat of the setting value which is transferred through the optical transmitter 64 and optical receptor 65 or alternatively inductively through an impulse transfer member or by means of the carrier frequency modulated up to the current supply from the camera skeleton frame 5 to the moving rotating shutter 1.

LIST OF REFERENCE NUMERALS

1 Rotating shutter
2 Shutter vane
3 Shutter adjustment vane
5 Camera skeleton frame (camera housing)
6 Transfer device
7,8 Sensor
9 Safety scanning device
10 Digital position counting and difference forming device
11 Control logic
12 Shutter adjustment vane position regulating device
13 Amplifier
14 Shutter vane scanning device
15, 16 Camera interface
20 Shutter shaft
21 Drive pinion
23 Opening in shutter shaft
30 Shutter adjustment vane shaft
31 Planetary gearing
32 Shutter adjustment vane gearing
33 Shutter adjustment vane motor
34 Potentiometer transmitter
40 Connecting lead
41-47 Leads
51-54 Ball bearings
60 Processor
61 Direct current converter or inverter on primary side
62 Transformer
63 Direct current converter or rectifier on secondary side
64 Optical transmitter of setting values transfer device
65 Optical receptor of setting variables transfer device
66 Setting variables amplifier
67 Actual measuring amplifier
68 Optical transmitter of actual value transfer device
69 Optical receptor of actual value transfer device
70, 80 Graduated plate
70*a-c*
71, 81 Scanning device
621 Primary winding of transformer
622 Secondary winding of transformer
701 Incremental track
702 Reference mark
703-706 Code track
707, 708 Sine/cosine track
711 Semi-conductor light source
712 Condenser lens
713 Scanning plate
714-717 Photo elements

The invention claimed is:

1. A method for detecting a shutter opening angle of an adjustable rotating shutter mounted in a film camera which comprises a circular segment or circular sector shaped shutter vane driven through a shutter shaft by a shutter motor, and a shutter adjustment vane mounted coaxial with the shutter vane and adjustable relative thereto by means of a shutter adjustment vane motor, the method comprising:
   detecting
      an absolute position of the shutter vane and an absolute position of the shutter adjustment vane with a resolution of n steps during one revolution of the rotatable shutter,
   and determining the shutter opening angle ($\alpha$) a of the rotatable shutter (1) from the equation $$\alpha = [P_{BF} - P_{VF}] * 360°/n$$

wherein
      $P_{BF}$ is the position of the shutter vane and
      $P_{VF}$ is the position of the shutter adjustment vane,
   wherein when the value of angle $\alpha$ is less than 0° the value is increased by 360° as long as the resulting value is greater than or equal to 0° or when the value of angle $\alpha$ is greater than or equal to 360° the value is reduced by 360° as long as the resulting value is less than 360°.

2. The method according to claim 1, wherein the absolute positions of the shutter vane and the shutter adjustment are determined using coded sensor tracks.

3. The method according to claim 2, wherein the absolute positions of the shutter vane and the shutter adjustment vane are detected as a sine and cosine signal per revolution of the rotating shutter and the shutter opening angle of the rotating shutter is determined through an arctan calculation from the sine and cosine signals.

4. The method according to claim 1, wherein the positions of the shutter vane and the shutter adjustment vane are detected incrementally, wherein at least one reference signal is provided per revolution of the rotatable shutter and wherein the detected incremental signals are stored with the reference signal and wherein the shutter opening angle ($\alpha$) of the rotatable shutter is determined from the equation $$\alpha = (Z_{BF} - Z_{VF} + O) * 360/n$$

wherein
      $Z_{BF}$ is the counter state of the shutter vane
      $Z_{VF}$ is the counter state of the shutter adjustment vane and
      O is a constant off-set which is determined from the equation $$O = I_{BF} + I_{VF} + K$$

wherein
      $I_{BF}$ is the index position of the shutter vane
      $I_{VF}$ is the index position of the shutter adjustment vane and
      K is a calibrating value
   wherein when the value of angle $\alpha$ is less than 0° the value is increased by 360° as long as the resulting value is greater than or equal to 0° or when the value of angle $\alpha$ is greater than or equal to 360° the value is reduced by 360° as long as the resulting value is less than 360° and wherein the calibrating value (K) is a correcting value arising from the relationship of a reference mark which is coupled to the shutter vane and a reference mark which is coupled to the shutter adjustment vane, wherein said reference marks are used in generating said at least one reference signal.

5. The method according to claim 1, wherein absolute positions of the shutter vane and the shutter adjustment vane are determined from distance-coded reference marks.

6. The method according to claim 1 wherein the shutter opening angle value is supplied as an actual value to a shutter adjustment vane position regulating device, wherein an ideal value of the shutter opening angle is manually input, wherein the difference between the ideal and actual value of the shutter opening angle is a setting variable for the shutter adjustment vane motor.

7. The method according to claim 1, wherein the positions of the shutter vane and shutter adjustment vane are interpolated before ascertaining the difference.

8. The method according to claim 1, wherein a mechanical locking or unlocking of the shutter adjustment vane is determined by scanning at a predetermined frequency and wherein when the shutter adjustment vane is mechanically blocked, a control of the shutter adjustment vane motor is blocked.

9. The method according to claim 1, wherein the position of the shutter vane, the position of the shutter adjustment vane, the value of the shutter opening angle of the adjustable rotatable shutter and signals relating to a mechanical locking or unlocking of the shutter adjustment vane are processed by a control logic.

10. The method according to claim 9, wherein the control logic initialises the detected positions.

11. The method according to claim 1, wherein a setting value for the shutter adjustment vane motor is transferred by a shutter adjustment vane position regulating device to the shutter adjustment vane motor without contact.

12. A device for detecting a shutter opening angle of an adjustable rotatable shutter mounted in a film camera which comprises a circular segment or circular sector shaped shutter vane driven through a shutter shaft by a shutter motor, and a shutter adjustment vane mounted coaxial with the shutter vane and adjustable relative thereto by means of a shutter adjustment vane motor, the device comprising:
  a first sensor coupled to the shutter vane for sensing an absolute position of the shutter vane and emitting a shutter vane position signal with a resolution of n steps during one revolution of the rotatable shutter;
  a second sensor coupled to the shutter adjustment vane for sensing an absolute position of the shutter adjustment vane and emitting a shutter adjustment vane position signal with a resolution of n steps during one revolution of the rotatable shutter; and
  a position counter receiving the shutter vane and the shutter adjustment vane position signals;
said position counter ascertaining the difference between the shutter vane position signal and the shutter adjustment vane position signal as an angle α from the equation $$\alpha = [P_{BF} - P_{VF}] * 360°/n$$

wherein
  $P_{BF}$ is the position of the shutter vane and
  $P_{VF}$ is the position of the shutter adjustment vane,
wherein when the value of angle α is less than 0° the value is increased by 360° as long as the resulting value is greater than or equal to 0° or when the value of angle α is greater than or equal to 360° the value is reduced by 360° as long as the resulting value is less than 360°.

13. The device according to claim 12, wherein the first and second sensors comprise absolute angle measuring instruments with several code tracks mounted on a graduated plate and scanning devices assigned to the code tracks.

14. The device according to claim 13, wherein the absolute angle measuring instruments comprise absolute coders, resolvers or pole wheel sensors.

15. The device according to claim 12, wherein the first and second sensors comprise incremental angle measuring instruments with a periodic incremental track mounted on a graduated plate and a reference mark track which has at least one reference mark fixing an absolute position of the graduated plate, and scanning devices associated with the incremental and reference mark track.

16. The device according to claim 15, wherein the reference mark track has distance-coded reference marks on which reference marks are made with defined variable spacing.

17. The device according to claim 13, wherein the first and second sensors have graduated plates with sine and cosine tracks and wherein a computing unit connected to an output side of one of said scanning devices detects sine and cosine signals and issues arctan values calculated from the sine and cosine signals.

18. The device according to claim 12, wherein the first and second sensors are absolute or incremental angle measuring instruments comprising photo electric, magneto resistive or permanent magnetic scanning capability.

19. The device according to claim 12 further comprising:
  a control logic receiving a signal relating to the difference between the shutter vane position signal and the shutter adjustment vane position signal, wherein the control logic is connected to an interface on a control of the film camera; and
  a shutter adjustment vane position regulating device which receives on an input side a signal relating the difference of the shutter vane position signal and the shutter adjustment vane position signal, and an ideal value issued by the control of the film camera through an interface for the shutter adjustment vane or for the shutter opening angle of the adjustable rotatable shutter, wherein said shutter adjustment vane position regulating device outputs from an output side a setting variable for the shutter adjustment vane motor.

20. The device according to claim 12, comprising a safety scanning device for detecting the shutter opening angle of the adjustable rotatable shutter, wherein an output of said safety scanning device is connected to a control logic for issuing absolute values of the shutter opening angle of the adjustable rotatable shutter.

21. The device according to claim 19 or 20, wherein the control logic is connected on an input side to a scanning device for detecting mechanical locking of the shutter adjustment vane, wherein the control logic blocks the control of the shutter adjustment vane motor when mechanical locking of the shutter adjustment vane is detected.

22. The device according to claim 12, wherein a shutter adjustment vane position regulating device is connected to an amplifier, said amplifier being connected to an energy transfer device and a signal transfer device for controlling the shutter adjustment vane motor.

23. The device according to claim 22, wherein the shutter adjustment vane position regulating device is connected to the energy transfer device and to the signal transfer device,
  said energy transfer device being connected to a motor amplifier, said motor amplifier comprising a control device which is connected to a first output of a processor for controlling and regulating the shutter adjustment vane motor,
  said signal transfer device being connected the processor,
  said processor being connected to the output of an actual value measuring amplifier,
  said actual value measuring amplifier being connected to a potentiometer transmitter coupled to the shutter adjustment vane motor, and
  a second input and output of the processor being connected to the signal transfer device.

24. The device according to claims 22 or 23, wherein at least one of said energy transfer device and signal transfer device generates a signal and provides for the transfer without contact of said signal.

25. The device according to claim 23, wherein the energy transfer device comprises a divided transformer operated at high frequency having a primary winding connected to a direct current converter on a primary side and a secondary winding connected to a direct current converter on a secondary side.

26. The device according to claim 23, wherein the signal transfer device comprises an optical transmitter and an optical receptor for bi-directional signal exchange between the shutter adjustment vane position regulating device and the processor.

27. The device according to claim 23, wherein the signal transfer device comprises an inductive signal transfer device for the bi-directional signal exchange between the shutter adjustment vane position regulating device and the processor.

28. The device according to claim 23, wherein the signal transfer device comprises a carrier frequency signal transfer device for the bi-directional signal exchange between the shutter adjustment vane position regulating device and the processor, wherein said carrier frequency signal transfer device modulates and superimposes signals to a carrier frequency the energy supply of the shutter adjustment vane motor.

29. The device according to claim 12, wherein a shutter adjustment vane position regulating device controls the shutter adjustment vane motor through a motor end stage and a rotational connection or a slip ring.

30. The device according to claim 12, wherein the first and second sensors are coupled to the shutter shaft and to a shutter adjustment vane shaft.

31. The device according to claim 12, wherein the shutter shaft is connected to a shutter drive through gearing.

32. The device according to claim 12, wherein the shutter adjustment vane is connected to the shutter adjustment vane motor through a shutter adjustment vane shaft and a gearing within the shutter shaft.

33. A method for detecting a shutter opening angle of an adjustable rotating shutter mounted in a film camera which comprises a circular segment or circular sector shaped shutter vane driven through a shutter shaft by a shutter motor, and a shutter adjustment vane mounted coaxial with the shutter vane and adjustable relative thereto by means of a shutter adjustment vane motor, the method comprising:

detecting the position of the shutter vane and the shutter adjustment vane during rotation of the rotatable shutter; and ascertaining the difference between the two positions as a value, said value being representative of the shutter opening angle of the rotatable shutter, wherein the positions of the shutter vane and the shutter adjustment vane are detected incrementally, wherein at least one reference signal is provided per revolution of the rotatable shutter and wherein the detected incremental signals are stored with the reference signal and wherein the shutter opening angle ($\alpha$) of the rotatable shutter is determined from the equation $$\alpha = [Z_{BF} - Z_{VF} + O] * 360/n$$

wherein $Z_{BF}$ is the counter state of the shutter vane $Z_{VF}$ is the counter state of the shutter adjustment vane and O is a constant off-set which is determined from the equation $$O = I_{BF} I_{VF} + K$$

wherein $I_{BF}$ is the index position of the shutter vane $I_{VF}$ is the index position of the shutter adjustment vane and K is a calibrating value wherein when the value of angle $\alpha$ is less than 0° the value is increased by 360° as long as the resulting value is greater than or equal to 0° or when the value of angle $\alpha$ is greater than equal to 360° the value is reduced by 360° as long as the resulting value is less than 360° and wherein the calibrating value (K) is a correcting value arising from the relationship of a reference mark which is coupled to the shutter vane and a reference mark which is coupled to the shutter adjustment vane, wherein said reference marks are used in generating said at least one reference signal.

* * * * *

UNITED STATES PATENT AND TRADEMARK OFFICE
CERTIFICATE OF CORRECTION

| | | |
|---|---|---|
| PATENT NO. | : 7,276,686 B2 | Page 1 of 1 |
| APPLICATION NO. | : 10/505182 | |
| DATED | : October 2, 2007 | |
| INVENTOR(S) | : Michael Haubmann | |

It is certified that error appears in the above-identified patent and that said Letters Patent is hereby corrected as shown below:

In the Claims

| | |
|---|---|
| Column 12, line 10, claim 1 | Delete "a" |
| Column 14, line 59, claim 23 | After "connected", Insert --to-- |
| Column 16, line 25, claim 33 | Delete "$0=I_{BF}I_{VF}+K$", Insert --$0=I_{BF}+I_{VF}+K$-- |

Signed and Sealed this

Twenty-eighth Day of October, 2008

JON W. DUDAS
*Director of the United States Patent and Trademark Office*